J. W. CLOUD.
FLEXIBLE METALLIC COUPLING.
APPLICATION FILED JAN. 26, 1915.

1,177,603.

Patented Apr. 4, 1916.

WITNESSES

INVENTOR
John W. Cloud
by Wm. W. Cady
Atty.

UNITED STATES PATENT OFFICE.

JOHN W. CLOUD, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA.

FLEXIBLE METALLIC COUPLING.

1,177,603.  Specification of Letters Patent.  Patented Apr. 4, 1916.

Application filed January 26, 1915. Serial No. 4,478.

*To all whom it may concern:*

Be it known that I, JOHN W. CLOUD, a citizen of the United States of America, and resident of London, England, have invented a certain new and useful Improvement in Flexible Metallic Couplings, of which the following is a specification.

This invention relates to flexible metallic pipe couplings, and the principal object is to provide a rotatable coupling connection offering slight resistance to rotation and in which the possibility of leakage is reduced to a minimum.

Figure 1:
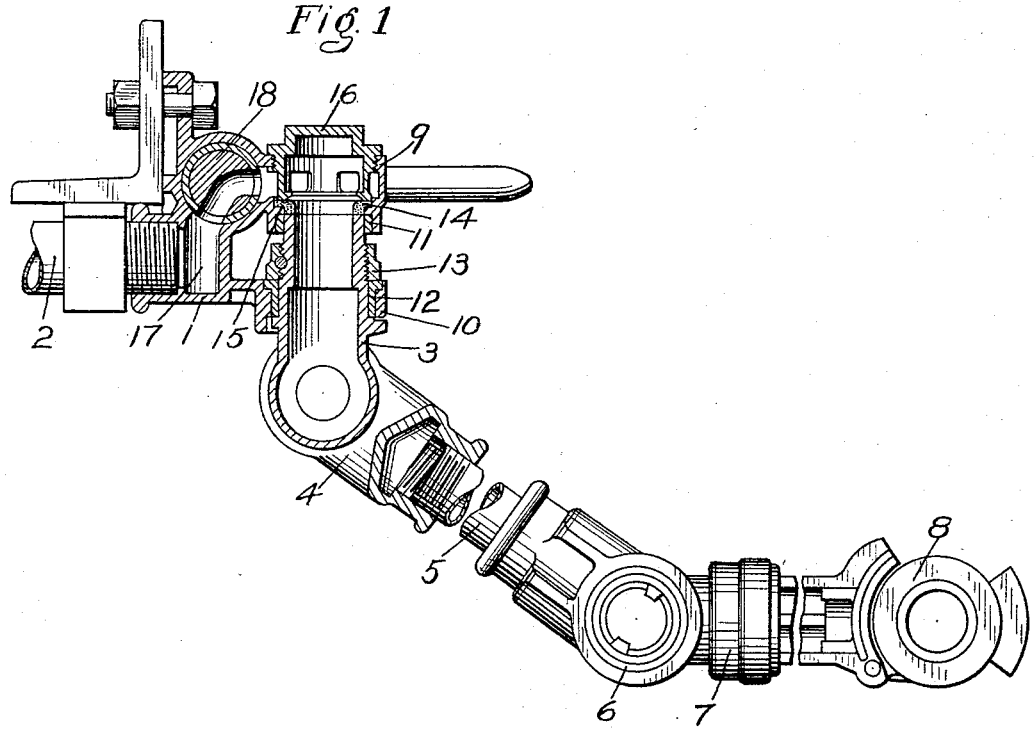
Figure 2:
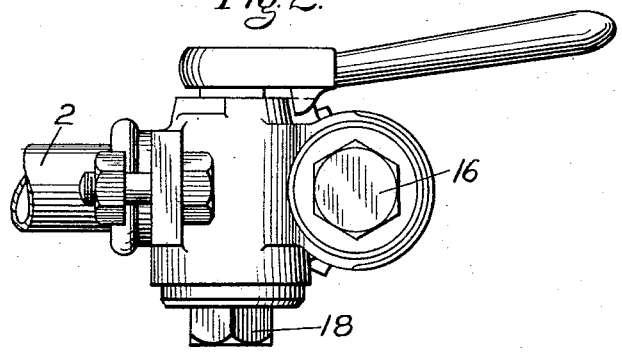

In the accompanying drawing; Figure 1 is a side elevation, partly in section, of a flexible pipe coupling embodying my invention, and Fig. 2 a plan view of a portion of the coupling shown in Fig. 1.

As shown in the drawing, the coupling may comprise a coupling bracket 1 connected to a train pipe 2 and supporting a tubular rotatable member 3. The latter is connected by a pivotal joint 4 with pipe 5, the lower end of which is connected by means of a pivotal joint 6 and a swivel joint 7 with a coupling head 8 of any desired construction.

The coupling bracket 1 is provided with two arms 9 and 10 having cylindrical bores arranged in vertical alinement and preferably provided with bushings 11 and 12 adapted to form bearings for the rotatable member 3. A flanged collar 13 is secured to the member 3 at a point intermediate the arms 9 and 10 and rests on the upper face of bushing 12.

Leakage at the upper end of the rotatable member 3 is prevented by means of a flanged gasket 14, the outer edge of which is gripped between an internal flange 15 on the arm 9 and a cap 16 which closes the upper end of the arm 9. The lower and inner edge of the gasket 14 is maintained closely in contact with the upper face of the member 3 by the pressure of fluid passing through the conduit.

A passage 17 in the bracket 1 containing a rotary plug cock 18 establishes communication from the train pipe 2 through openings in the cap 16 to the conduit formed in the rotary member 3. By supporting the rotatable member as hereinbefore described, the same can rotate easily and freely and it will be seen that the only gasket required to prevent leakage is free from any pressure due to the weight of the coupling and will thus wear a long time while maintaining a tight joint against leakage.

Having now described my invention, what I claim as new and desire to secure by Letters Patent, is—

1. A flexible pipe coupling comprising a bracket having two arms, a tubular member rotatably mounted in bearings in said arms and extending vertically downward through one arm, the weight of said member being supported by said arm, and a gasket mounted within the other arm for making a tight joint at the union of said arm and said member.

2. A flexible pipe coupling comprising a bracket having two arms provided with cylindrical bearings arranged in vertical alinement, a conduit member mounted to rotate in said bearings, said member extending vertically downward through the bearing in one arm, means associated with said member for supporting same on said arm, and a gasket mounted in the other arm for making a tight joint at the upper exposed end of said member.

3. A flexible pipe coupling comprising a bracket having two arms each provided with a cylindrical bearing, the bearings being arranged in vertical alinement, a conduit member rotatably mounted in said bearings, a collar secured to said member for supporting same on one arm, a gasket mounted in the other arm and bearing on the free end of said member, and a cap for clamping said gasket in position.

In testimony whereof I have hereunto set my hand.

JOHN W. CLOUD.

Witnesses:
 A. A. BERGIN,
 R. WESTACOTT.

Copies of this patent may be obtained for five cents each, by addressing the "Commissioner of Patents, Washington, D. C."